United States Patent [19]

Clews et al.

[11] 4,093,158

[45] June 6, 1978

[54] AIRPLANE INSTRUMENT WITH THROTTLE CONTROL SELECTIVELY REGULATED BY AIR SPEED OR LIFT

[75] Inventors: David George Clews; David Sweeting, both of Maidstone, England

[73] Assignee: Elliott Brothers (London) Limited, Chelmsford, England

[21] Appl. No.: 753,711

[22] Filed: Dec. 23, 1976

[30] Foreign Application Priority Data

Feb. 11, 1976 United Kingdom ................. 5381/76

[51] Int. Cl.² .............................................. G05D 1/08
[52] U.S. Cl. .................................. 244/182; 73/178 R; 244/181; 340/27 AT; 340/27 SS; 364/435; 364/440
[58] Field of Search ..................... 73/178 R, 178 T, ; 235/150.2, 150.22; 244/181, 182, 187, 188; 307/243, 355, 356; 318/583, 584; 328/152, 154; 340/27 R, 27 AT, 27 SS; 364/434, 435, 440

[56] References Cited

U.S. PATENT DOCUMENTS

| | | | |
|---|---|---|---|
| 2,933,268 | 4/1960 | Jude et al. | 244/188 X |
| 3,486,722 | 12/1969 | Greene | 244/182 X |
| 3,522,729 | 8/1970 | Miller | 244/182 X |
| 3,614,036 | 10/1971 | Foster | 244/181 X |
| 3,648,079 | 3/1972 | Bryant et al. | 307/355 X |
| 3,980,258 | 9/1976 | Simeon | 244/182 |

*Primary Examiner*—Stephen G. Kunin
*Attorney, Agent, or Firm*—Kirschstein, Kirschstein, Ottinger, Frank & Corbin

[57] ABSTRACT

An aircraft instrument comprising equipment for providing a first signal which is a function of airspeed and suitable for use in controlling an aircraft by variation of the airspeed to a predetermined value, an apparatus for providing a second signal which is a function of lift and suitable for use in controlling the aircraft by variation of the airspeed to adjust the lift to a predetermined value, and a selecting apparatus arranged to apply the second signal to a signal utilization mechanism for controlling the aircraft in accordance with said second signal except when said second signal falls below a predetermined datum level, which represents a safe margin above stall, whereupon the first signal is applied to the signal utilization mechanism, the selecting apparatus being arranged to provide a transition between control by the first signal and control by the second signal which is shorter than a transition between control by the second signal and control by the first signal.

13 Claims, 5 Drawing Figures

AIRPLANE INSTRUMENT WITH THROTTLE CONTROL SELECTIVELY REGULATED BY AIR SPEED OR LIFT

According to the present invention an aircraft instrument comprises means for providing a first signal which is a function of airspeed and suitable for use in controlling an aircraft by variation of the airspeed to a predetermined value, means for providing a second signal which is a function of lift and suitable for use in controlling the aircraft by variation of the airspeed to adjust the lift to a predetermined value, and selecting means arranged to apply the second signal to signal utilization means for controlling the aircraft in accordance with said second signal except when said second signal falls below a predetermined datum level, which represents a safe margin above stall, whereupon the first signal is applied to the signal utilization means.

The signal utilization means may comprise indicating apparatus for facilitating manual control of the aircraft in accordance with the selected signal, or may comprise apparatus for automatically controlling the aircraft in accordance with the selected signal.

Preferably the first signal is an error signal constituted by the difference between actual airspeed and a pilot preselected airspeed, while the second signal is an error signal constituted by the difference between actual lift and a computed lift having a safe margin above stall.

The selecting means may include switching means arranged to provide a smooth and continuous transition between control by one signal and control by the other signal. The transition between control by the first signal and control by the second signal may be much shorter than the transition between control by the second signal and control by the first signal. Typically, the transition between control by the first signal and control by the second signal would take about 0.1 seconds, while the transition between control by the second signal and control by the first signal would take about 6.0 seconds.

The invention will now be described, by way of example, with reference to the accompanying drawings in which.

Figure 1:
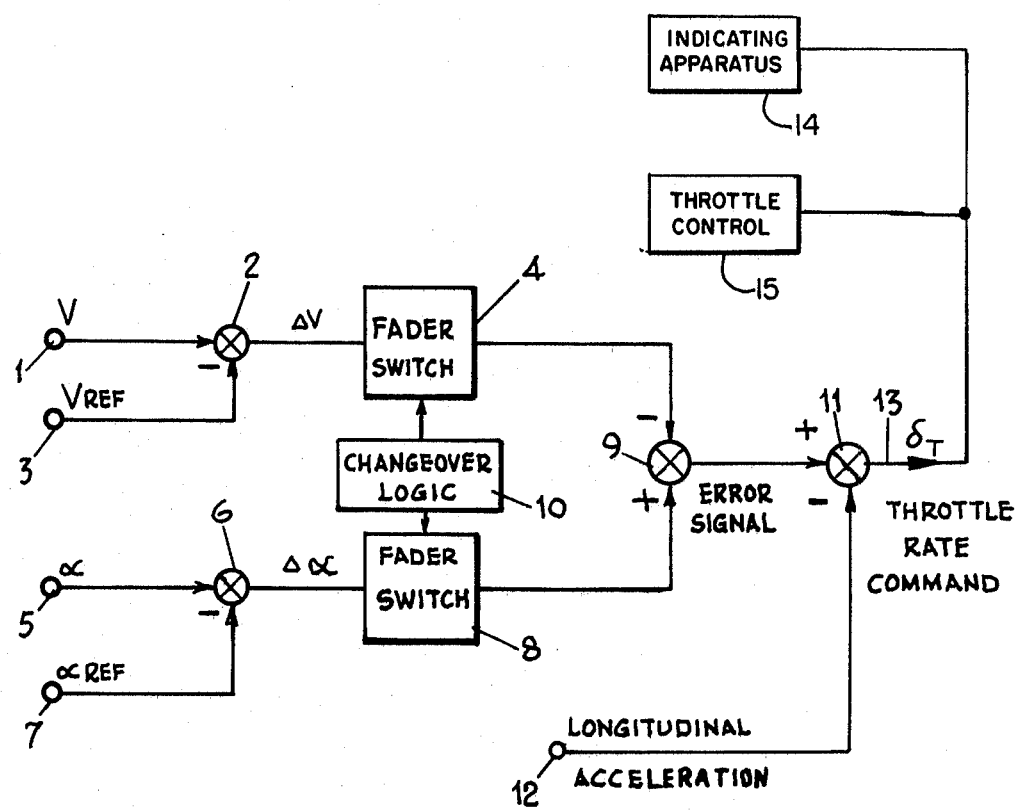
FIG. 1 is a schematic circuit diagram of a simplified form of aircraft instrument in accordance with the invention.

Referring in the first instance to FIG. 1, the aircraft instrument comprises an input terminal 1 to which is applied a signal V indicative of the actual airspeed of the aircraft derived from a pitot tube or other airspeed sensing arrangement. The input terminal 1 is connected to a mixer 2 to which is also connected an input terminal 3 having applied thereto a signal $V_{REF}$ indicative of an airspeed preselected by the aircraft pilot. The preselected airspeed may be set manually by a pointer on the airspeed indicator or by any other suitable setting arrangement, and corresponds to the pilot's estimate of the airspeed which would be suitable for prevailing conditions of flight. The mixer 2 is arranged to provide an error signal $\Delta V$ constituted by the difference between the actual airspeed and the pilot preselected airspeed, and to apply the error signal $\Delta V$ to the input of a fader switch 4.

An input terminal 5 to which is applied a signal $\alpha$ indicative of the actual lift of the aircraft is connected to a mixer 6. The signal $\alpha$ can conveniently be derived from two vanes, one on each side of the aircraft, arranged to monitor the angle of incidence of the aircraft and to provide a signal indicative of the average of the angles of incidence measured by the two vanes. An input terminal 7 also connected to the mixer 6 has applied thereto a signal $\alpha_{REF}$ indicative of an automatically computed lift which is a safe margin above stall in the prevailing conditions. The mixer 6 is arranged to provide an error signal $\Delta\alpha$ constituted by the difference between the actual lift and the computed lift and to apply the error signal $\Delta\alpha$ to the input of a fader switch 8.

The output signals from the fader switches 4 and 8 are fed to a further mixer 9 under the control of a changeover logic circuit 10 arranged to select which of the error signals $\Delta V$ and $\Delta\alpha$ is to be fed to a mixer 11. An input terminal 12 to which an input signal indicative of the longitudinal acceleration of the aircraft derived from an accelerometer, may be applied is connected to the mixer 11, an output signal $\delta_T$ of which appears on an output lead 13 and is applied to an indicating apparatus 14 or to apparatus 15 for automatically controlling the aircraft throttle in accordance with the selected signal.

Figure 2:
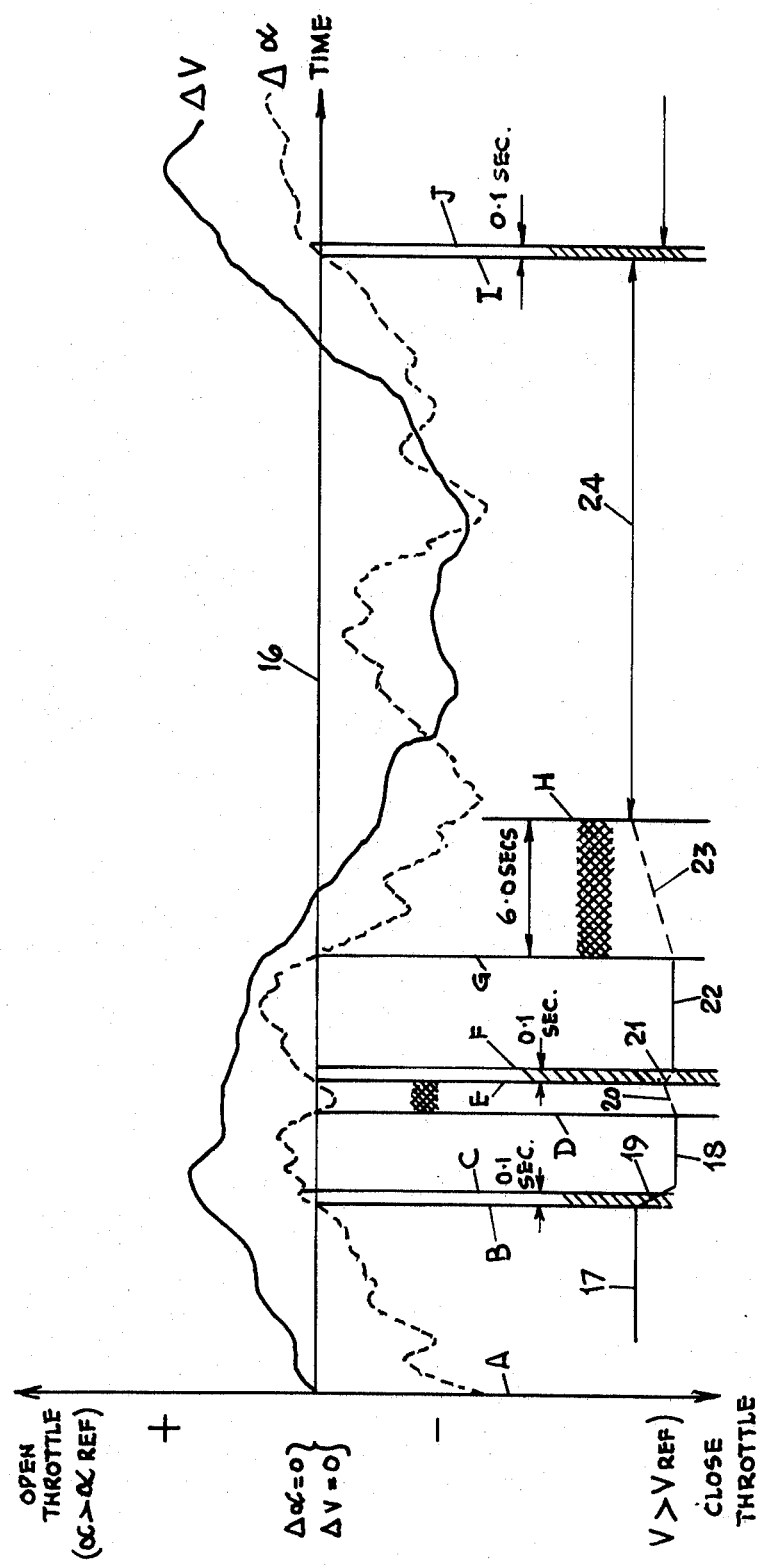
FIG. 2 is a graph illustrating a sequence of airspeed and lift error signals produced by the aircraft instrument shown in FIG. 1.

The aircraft instrument so far described operates in the following manner to provide control of the airspeed of the aircraft in accordance with the selected error signal $\Delta V$ or $\Delta\alpha$. It will be assumed that the pilot of the aircraft has set a preselected airspeed which he considers to be suitable for the prevailing conditions thus providing an input signal $V_{REF}$ at input terminal 3, and that the computed lift for the prevailing conditions is providing an input signal $\alpha_{REF}$ at input terminal 7. During flight signals V and $\alpha$ indicative of the actual airspeed and actual lift will be applied respectively to input terminals 1 and 5 causing error signals $\Delta V$ and $\Delta\alpha$ to be applied respectively to the inputs of fader switches 4 and 8. As shown in FIG. 2 both the airspeed error signal $\Delta V$ and the lift error signal $\Delta\alpha$ vary about a zero or null level 16 in accordance with the behaviour of the aircraft, this null level 16, in the case of the lift error signal $\Delta\alpha$, being the predetermined value about which control of the aircraft is in accordance with the lift error signal $\Delta\alpha$.

During an initial period AB the airspeed error signal $\Delta V$ is positive, that is to say the actual airspeed is greater than the preselected airspeed, while the lift error signal $\Delta\alpha$ is negative, that is to say the actual lift is less than the computed lift. Since the lift error signal $\Delta\alpha$ is below the null level 16, control of the aircraft will be accordance with the airspeed error signal $\Delta V$, resulting, as indicated by line 17, in a demand at output lead 13 to close the throttle and decrease the thrust of the engine. During the period BD the lift error signal $\Delta\alpha$ become positive and therefore control of the aircraft will be in accordance with the lift error signal $\Delta\alpha$, resulting, as indicated by line 18, in an initial demand at output lead 13 to open the throttle and increase the thrust of the aircraft. Control continues in accordance with the fluctuations in amplitude of the lift error signal $\Delta\alpha$.

During the period BC when the changeover from control by the airspeed error signal $\Delta V$ to control by the lift error signal $\Delta\alpha$ is taking place, the changeover logic circuit 10 controls the outputs of the two fader switches 4 and 8 in a manner such that a smooth and continuous transition, as indicated by the line 19, takes place. Typically, the period BC in which transition takes place would have a duration of about 0.1 second. The changeover logic circuit 10 and the two fader switches 4 and 8 are arranged so that a changeover in the opposite direction, that is from control by the lift error signal $\Delta\alpha$ to control by the airspeed error signal $\Delta V$, is smooth and continuous and has a duration of about 6.0 seconds. During transition, in either sense, between pure $\Delta V$ control and pure $\Delta\alpha$ control, the signal developed at the output of the mixer 9 has time varying components derived from the error signals $\Delta V$ and $\Delta\alpha$.

During the period DE the lift error signal $\Delta\alpha$ again becomes negative so that control of the aircraft reverts to the airspeed error signal $\Delta V$, resulting in a demand to close the throttle as indicated by line 20. However, as can be seen in FIG. 2 the changeover is terminated during the period EF when the lift error signal $\Delta\alpha$ again becomes positive so that control of the aircraft is in accordance with the lift error signal $\Delta\alpha$, resulting in a demand to open the throttle as indicated by the line 21. The lift error signal $\Delta\alpha$ remains positive throughout the period FG, so that control of the aircraft continues in accordance with the fluctuations of the lift error signal $\Delta\alpha$.

During the period GH the lift error signal $\Delta\alpha$ again becomes negative so that control of the aircraft is in accordance with the airspeed error signal $\Delta V$. This time the changeover logic circuit 10 and the two fader switches 4 and 8 complete the smooth and continuous changeover in the full 6.0 seconds as indicated by the line 23. Control of the aircraft in accordance with the fluctuations of the airspeed error signal $\Delta V$ continues throughout the period HI as indicated by the line 24. A further change to control by the lift error signal $\Delta\alpha$ occurs during the period IJ when the lift error signal again goes positive. Throughout the operation of the aircraft instrument the input signal to mixer 11 may be modified by the longitudinal acceleration damping signal applied to input terminal 12.

Figure 3:
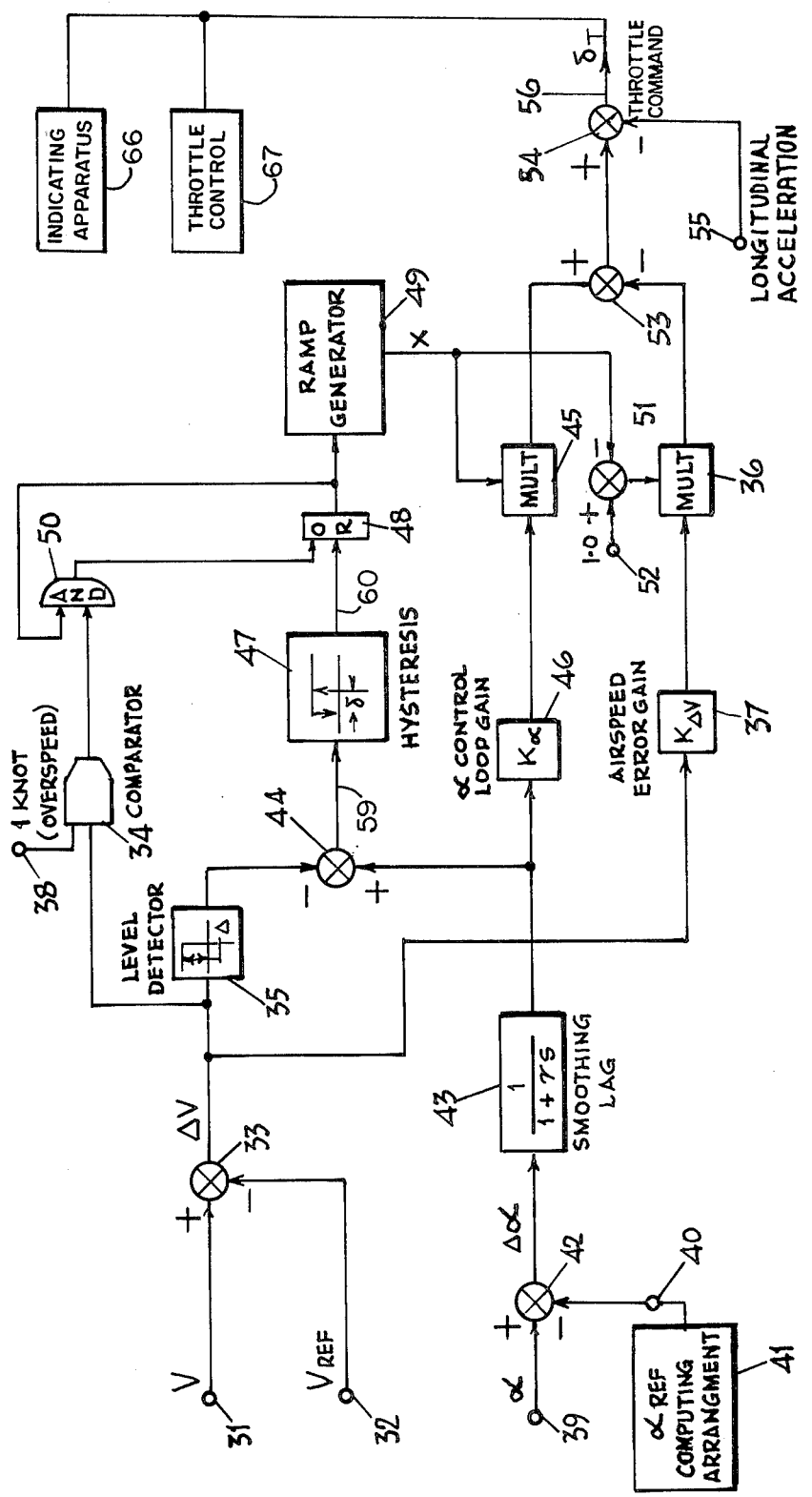
FIG. 3 is a schematic circuit diagram of a more elaborate aircraft instrument in accordance with the invention.

Referring now to FIG. 3, the aircraft instrument comprises an input terminal 31 to which a signal V is applied and an input terminal 32 to which a signal $V_{REF}$ is applied to provide respective inputs to a mixer 33 arranged to produce an error signal $\Delta V$ constituted by the difference between the actual airspeed and the pilot preselected airspeed. The output of the mixer 33 is connected to an input of a comparator 34, to the input of a level detector 35, and to an input of a multiplier 36 by way of an amplifier 37. The comparator 34 has a further input from an input terminal 38 to which is applied a signal indicative of a predetermined amount (say 1 knot) above the pilot preselected air speed.

An input terminal 39 to which a signal $\alpha$ is applied and an input terminal 40 to which a signal $\alpha_{REF}$ is applied by a signal computing arrangement 41, provide respective inputs to a mixer 42 arranged to produce an error signal $\Delta\alpha$ constituted by the difference between the actual lift and the computed lift. The output of the mixer 42 is connected to the input of a filter 43 designed to remove noise and transients from the error signal $\Delta\alpha$, the output from which is fed to an input of a mixer 44 and to a multiplier 45 by way of an amplifier 46. The mixer 44 receives a second input from the output of the level detector 35 and provides an output which is fed to an hysteresis circuit 47.

The output of the hysteresis circuit 47 provides one input to an OR gate 48 which has its output connected to a ramp generator 49. The output of the OR gate 48 also forms an input to an AND gate 50 which receives a second input from the output of the comparator 34 and has an output which provides an input to the OR gate 48. The ramp generator 49 provides an input to the multiplier 45 and also provides an input to a mixer 51 which receives another input from an input terminal 52 to which a reference signal is applied. The output from the mixer 51 forms a second input to the multiplier 36. The outputs from the multipliers 36 and 45 are fed to a mixer 53 which provides an input to a mixer 54 having a further input derived from an input terminal 55 to which a signal indicative of the longitudinal acceleration of the aircraft is applied.

The aircraft instrument shown in FIG. 3 operates in a manner generally similar to that described with reference to FIG. 1, the mixers 33 and 42 providing respective error signals $\Delta V$ and $\Delta\alpha$ which are selected and utilized to provide an output signal $\delta T$ which appears on an output lead 56 and is applied to an indicating apparatus 66 or to apparatus 67 automatically controlling the aircraft throttle. Assume that prior to a period AB illustrated in FIG. 4 the lift error signal $\Delta\alpha$ has been below the null level 57 and the aircraft has been controlled in accordance with the airspeed error signal $\Delta V$. When the lift error signal $\Delta\alpha$ goes positive a smooth and continuous transition between control by the airspeed error signal $\Delta V$ and control by the lift error signal $\Delta\alpha$ is brought about by the ramp generator 49 which provides an output signal X to control the signals fed to the mixer 53 by the multipliers 36 and 45. The ramp generator 49 feeds the ramp signal X to the multiplier 45 and its complement 1-X to the multiplier 36 by way of the mixer 51 so that when the airspeed error signal $\Delta\alpha$ is in control the ramp signal X = O and the multiplier 45 is set to zero.

Similarly when the lift error signal $\Delta\alpha$ goes negative a smooth and continuous transition between control by the lift error signal $\Delta\alpha$ and control by the airspeed error signal $\Delta V$ is brought about by the ramp generator 49 which provides an output signal X' to control the signals fed to the mixer 53 by the multipliers 36 and 45. The ramp generator 49 feeds the ramp signal X' to the multiplier 45 and its complement 1-X' to the multiplier 36 by way of the mixer 51. The ramp signals X and X' from the ramp generator 49 are such that the lift error signal is switched in rapidly, for example in 0.1 seconds, but is switched out relatively slowly, for example in 6.0 seconds. Since the multipliers 45 and 36 are complementary it follows that a 50:50 mixture of lift error signal $\Delta\alpha$ and airspeed error signal $\Delta V$ is being fed to the mixer 53 when the ramp signal X or X' is half-way up the ramp. This contributes to the smoothness of the changeover. The ramp generator 49 is designed so that it responds to a change of command from one error signal to the other, i.e. the ramp signal can be halted at any stage and its direction immediately reversed with the appropriate ramp rate for the transition called for.

The hysteresis switch 47 has an input signal 59 formed by the difference between the lift error signal $\Delta\alpha$ and a signal $\Delta$ provided by the output of the level detector 35. If the output signal $\Delta$ is zero, control by the lift error signal $\Delta\alpha$ occurs when the lift error signal $\Delta\alpha$ becomes positive and continues until it drops below the threshold $\delta$ of the hysteresis switch which corresponds to 0.5° of incidence. If the lift error signal is in the range which corresponds to $-0.5$ to 0° of incidence, control will revert to the airspeed error signal $\Delta V$ when $\Delta V$ becomes negative since $\Delta$ corresponds to 0.6° of incidence which is just greater than $\delta$. Hence the level detector 35 has the capability of "unsticking" the hysteresis switch 47 so that control reverts to the airspeed error signal $\Delta V$ when the lift error becomes negative provided that the airspeed error signal $\Delta V$ would command a safe throttle movement, i.e. $\Delta V$ is negative.

Figure 4:
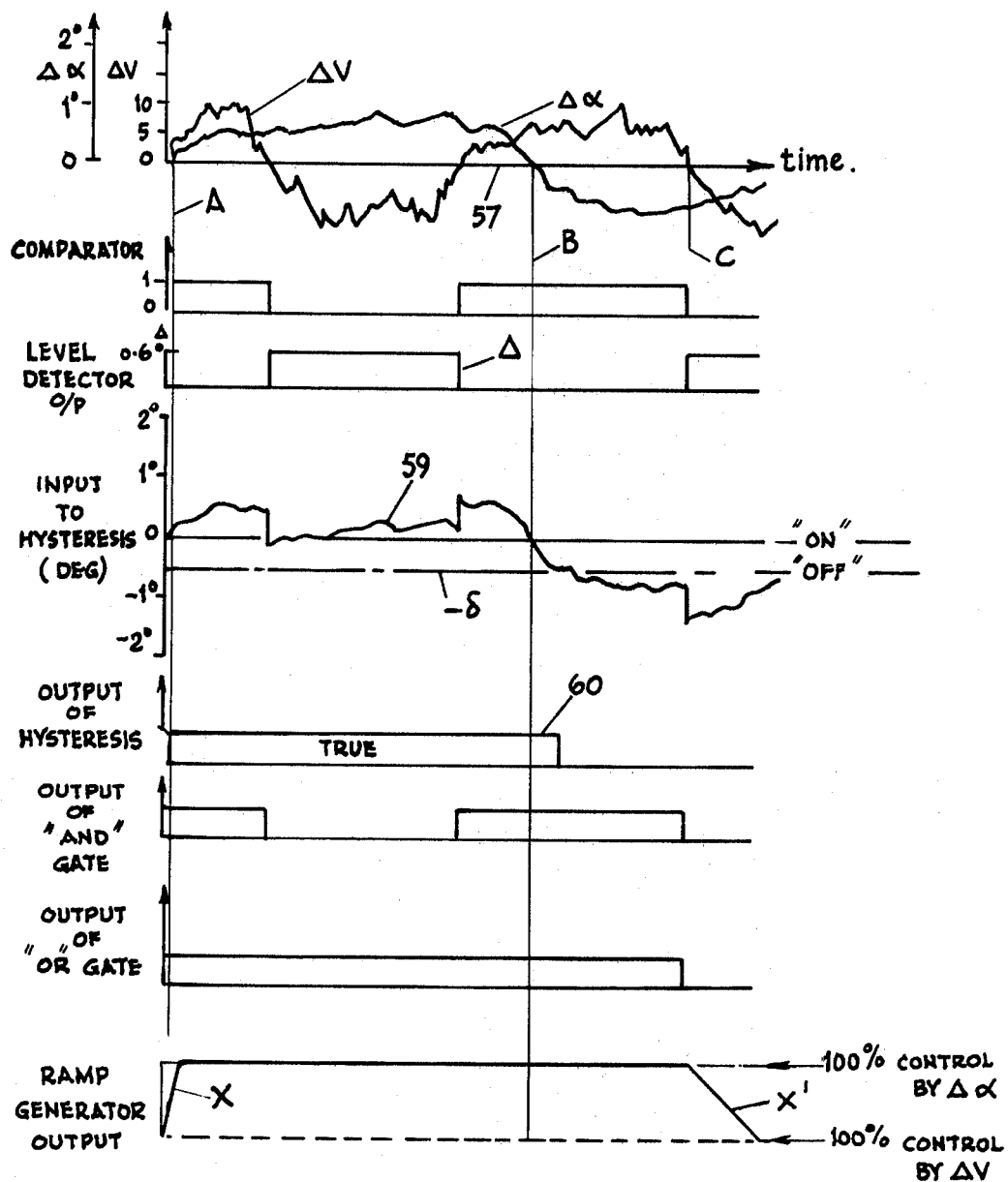
FIG. 4 is a series of graphs illustrating a sequence of airspeed and lift error signals produced by the aircraft instrument shown in FIG. 3 and the corresponding operational states of various components shown in that Figure.

An additional refinement of the airspeed instrument of FIG. 3 is the provision of a latching circuit formed by the AND gate 50 and OR gate 48 which are driven by the comparator and linked to the hysteresis switch 47. This latching circuit ensures that a return to control by the airspeed error signal $\Delta V$ cannot be brought about by transient changes in the lift error signal $\Delta\alpha$ since the instrument cannot revert to control by the airspeed error signal $\Delta V$ until the latch is unlocked by the airspeed reducing to less than 1 knot above the preselected airspeed $V_{REF}$. The operation of this latching circuit is also illustrated in FIG. 4 in which it can be seen that although the output signal 60 from the hysteresis circuit 47 falls to zero shortly after the end of the period AB, switching to control by the airspeed error signal $\Delta V$ commences at the time C when the airspeed error signal $\Delta V$ has reduced to zero.

Figure 5:
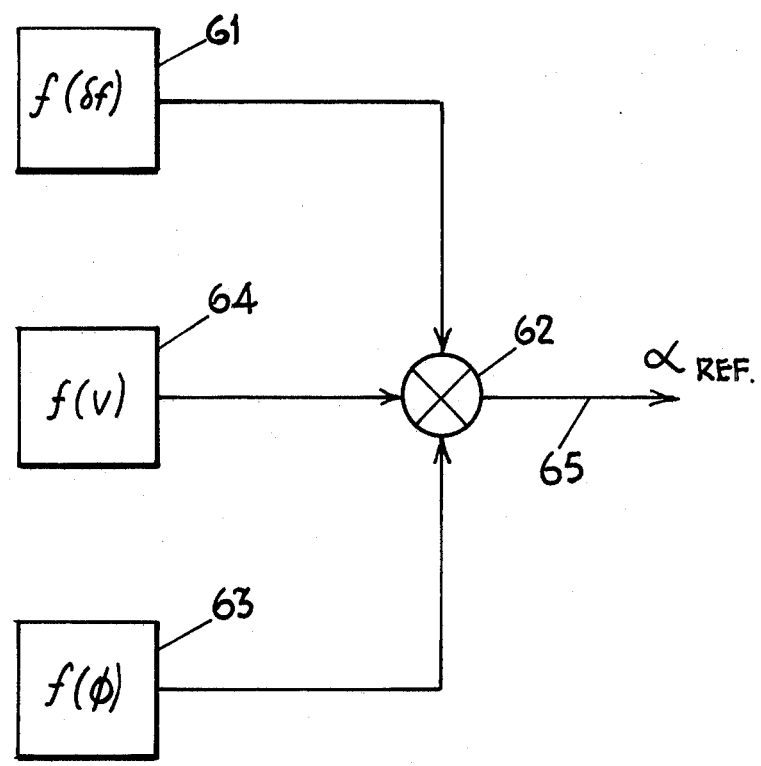
FIG. 5 is a schematic circuit diagram of an arrangement for computing a non-pilot selected lift signal.

The computing arrangement 41 which provides the signal $\alpha_{REF}$ is shown in FIG. 5 and comprises a sensing and computing arrangement 61 for producing a signal whose magnitude is a function of the position of the aircraft flaps and which is fed to a mixer 62. A second sensing and computing arrangement 63 is arranged to produce a signal which is a function of the angle of bank of the aircraft and which is also fed to the mixer 62. The mixer 62 which is also supplied with a signal proportional to V from a third sensing and computing arrangement 64, is arranged to combine these signals and provide the signal $\alpha_{REF}$ on an output lead 65 indicative of a lift a safe margin above stall.

We claim:

1. An aircraft instrument comprising:
   (a) means for providing a first signal which is a function of airspeed and suitable for use in controlling an aircraft by variation of the airspeed to a predetermined value;
   (b) means for providing a second signal which is a function of lift and suitable for use in controlling the aircraft by variation of the airspeed to adjust the lift to a predetermined value;
   (c) selecting means arranged to apply the second signal to signal utilization means for controlling the aircraft in accordance with said second signal except when said second signal falls below a predetermined datum level, which represents a safe margin above stall, whereupon the first signal is applied to the signal utilization means; and
   (d) the selecting means being arranged to provide a transition between control by the first signal and control by the second signal which is shorter than a transition between control by the second signal and control by the first signal.

2. An aircraft instrument as claimed in claim 1, wherein the first signal is an error signal constituted by the difference between actual airspeed and a pilot preselected airspeed.

3. An aircraft instrument as claimed in claim 1, wherein the second signal is an error signal constituted by the difference between actual lift and a computed lift having a safe margin above stall.

4. An aircraft instrument as claimed in claim 3, wherein the computed lift is a function of the position of aircraft flaps.

5. An aircraft instrument as claimed in claim 3, wherein the computed lift is a function of the angle of bank of the aircraft.

6. An aircraft instrument as claimed in claim 3, including means for providing the computed lift comprising a first sensing and computing arrangement for producing a signal which is a function of the position of aircraft flaps, a second sensing and computing arrangement for producing a signal which is a function of the angle of bank of the aircraft, a third sensing and computing arrangement for producing a signal which is a function of the actual airspeed of the aircraft, and a mixing arrangement for combining these signals to provide an output signal indicative of a computed lift a safe margin above stall.

7. An aircraft instrument as claimed in claim 1, wherein the signal applied to the signal utilization means is arranged to be modified in accordance with the longitudinal acceleration of the aircraft.

8. An aircraft instrument as claimed in claim 1, wherein the selecting means is arranged to provide a smooth and continuous transition between control by one signal and control by the other signal.

9. An aircraft instrument as claimed in claim 1, wherein the selecting means is arranged to provide a transition between control by the first signal and control by the second signal which takes substantially 0.1 seconds, and a transition between control by the second signal and control by the first signal which takes substantially 6.0 seconds.

10. An aircraft instrument as claimed in claim 1, wherein the signal utilization means comprises apparatus for automatically controlling the aircraft in accordance with the selected signal.

11. An aircraft instrument as claimed in claim 1, wherein the signal utilization means comprises apparatus for automatically controlling the aircraft throttle in accordance with the selected signal.

12. An aircraft instrument as claimed in claim 1, wherein the signal utilization means comprises indicating apparatus for facilitating manual control of the aircraft in accordance with the selected signal.

13. An aircraft instrument as claimed in claim 1, provided with latching circuit means arranged to ensure that a return to control by the first signal cannot be brought about by transient changes in the second signal.

* * * * *